United States Patent
Cohen

(10) Patent No.: US 8,957,860 B2
(45) Date of Patent: Feb. 17, 2015

(54) RFID-BASED INPUT DEVICE

(71) Applicant: International Business Machines Corporation, Armonk, NY (US)

(72) Inventor: Guy M Cohen, Mohegan Lake, NY (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 13/906,017

(22) Filed: May 30, 2013

(65) Prior Publication Data

US 2013/0335326 A1    Dec. 19, 2013

Related U.S. Application Data

(62) Division of application No. 12/847,087, filed on Jul. 30, 2010, now Pat. No. 8,547,335.

(51) Int. Cl.
| | | |
|---|---|---|
| *G09G 5/08* | (2006.01) | |
| *G06F 3/033* | (2013.01) | |
| *G06F 3/0354* | (2013.01) | |
| *H04L 12/933* | (2013.01) | |
| *H04L 12/937* | (2013.01) | |
| *H04L 12/935* | (2013.01) | |
| *H04L 12/931* | (2013.01) | |

(52) U.S. Cl.
CPC .......... *G06F 3/03543* (2013.01); *H04L 49/153* (2013.01); *H04L 49/254* (2013.01); *H04L 49/3081* (2013.01); *H04L 49/45* (2013.01); *H04L 49/3009* (2013.01); *H04L 49/3072* (2013.01)
USPC .......................................... 345/163; 345/157

(58) Field of Classification Search
CPC .... G06F 3/039; G06F 3/0354; G06F 3/03543
USPC ......... 345/156–184; 178/18.01–18.09, 18.11, 178/19.01–19.07
See application file for complete search history.

(56) References Cited

U.S. PATENT DOCUMENTS

| | | | | |
|---|---|---|---|---|
| 7,898,505 | B2* | 3/2011 | Blythe et al. | 345/30 |
| 8,485,450 | B2* | 7/2013 | Alden | 235/493 |
| 8,552,979 | B2* | 10/2013 | Chi-Boon et al. | 345/158 |
| 2005/0170778 | A1* | 8/2005 | Uchiyama et al. | 455/41.2 |
| 2006/0284842 | A1* | 12/2006 | Poltorak | 345/157 |
| 2009/0033632 | A1* | 2/2009 | Szolyga et al. | 345/173 |

* cited by examiner

*Primary Examiner* — Stephen Sherman
(74) *Attorney, Agent, or Firm* — Michael J. Buchenhorner; Vazken Alexanian

(57) ABSTRACT

An input device for use with a computer system includes: a pad and a portable unit operating as a computer mouse. The pad includes: a first antenna providing power to the portable unit, a radio frequency transmitter, a radio frequency receiver, a data link between the pad and the computer system, and an array of radio frequency antennas used for tracking a location of the portable unit. The portable unit includes at least one mouse antenna reflecting the radio frequency signals from the pad. The reflected radio frequency signals are used to estimate a location of the portable unit with respect to the array of radio frequency antennas in the pad.

18 Claims, 8 Drawing Sheets

200

RFID-BASED INPUT DEVICE

CROSS-REFERENCE TO RELATED APPLICATIONS

This application is a divisional of, and claims priority to, U.S. patent application Ser. No. 12/847,087, filed on Jul. 30, 2010, which application is incorporated herein by reference in its entirety.

STATEMENT REGARDING FEDERALLY SPONSORED-RESEARCH OR DEVELOPMENT

None.

INCORPORATION BY REFERENCE OF MATERIAL SUBMITTED ON A COMPACT DISC

None.

FIELD OF THE INVENTION

The invention disclosed broadly relates to the field of input devices for interactive machines such as computers and gaming machines and more particularly relates to the field of wireless input devices.

BACKGROUND OF THE INVENTION

Wireless input devices such as the wireless mouse have become popular because they eliminate the inconvenience associated with wires and cables. Among their shortcomings is that a wireless mouse is heavy compared to a conventional wired mouse because it requires batteries to power up. Although initially the extra weight may not be bothersome, frequent users will feel the additional stress and strain on their hand and wrist. This can lead to, or aggravate, stress-related injuries such as carpal tunnel syndrome.

Referring to FIG. 1A, there is shown a conventional computer system 100 using a wired mouse 102. The mouse derives its name from the resemblance to the animal of the same name. The wire is said to resemble the tail. Computer mice such as mouse 102 can detect the X-Y translation of the mouse position by mechanical or optical methods. The mouse movement is typically translated by a device driver (software that processes input from a device such as a mouse) to a relative movement of the cursor on the computer screen. As the mouse 102 is moved around a surface such as pad 104, the screen cursor moves as well in a well known relationship.

Computer system 100 includes a processing system (computer 101) which communicates with the input/output (I/O) devices. Examples of conventional I/O devices include a keyboard, mouse, display, removable and fixed recordable media (e.g., floppy disk drives, tape drives, CD-ROM drives, DVD-RW drives, Flash drives, etc.), touch screen displays and the like.

FIG. 1B illustrates the computer system of FIG. 1A with a typical wireless mouse 103. The wireless mouse 103 includes an optical system to detect X-Y translation of the mouse position. Mouse 103 also includes a radio transmitter to send wireless signals to the computer 101 when the mouse position has changed. These signals cause the computer 101 to update the location of a cursor displayed on a screen. Both the optical system and the radio transmitter are operated by batteries in the mouse 202. This mouse operates only on the pad 104, or on other surfaces that provide enough contrast so that the optical system can detect a change when the mouse is translated. If the mouse is lifted above the surface or placed on a highly reflective surface the optical system typically fails to detect movement in the X-Y plane correctly. The optical mouse 103 does not provide information on Z-translation (height) because conventional computer mice movement is limited to the x-y plane (e.g. movement over a mouse pad or a table).

US Published Application 2005/0219208 by Eichenberger et al. discloses a wireless input device, wherein a key stored in a receiver or a memory within the mouse can be transmitted by a radio-frequency identification (RFID) device provided in the mouse. This way, the mouse may be carried in a user's pocket and may be used to authenticate the user. However, the device disclosed uses conventional location determining means.

US Published Application 2005/0237295 by Anderson discloses a computer and RFID-based input device, wherein the input device can also operate together with another RFID product. For example, the computing arrangement can be adapted to receive and decode the signal from the RF transponders only when the computing arrangement detects the presence of an authorized RFID tag, which may be provided on a user ID card. However this device does not provide a radio frequency indication of the location of the mouse.

US Published Application 2006/0107061 by Holovacs discloses providing secure access to a KVM (keyboard, video, mouse) switch and other server management systems, wherein an RFID transceiver is coupled to or integrated with the system for detecting the presence of RFID tags that are within range of communications. A user workstation is only operable if the RFID transceiver detects a valid RFID tag.

US Published Application 2007/0195058 by Lin discloses a wireless cursor pointing device, which relates to a wireless cursor pointing device without the need for a battery. The wireless cursor pointing device transmits a signal through a Radio Frequency Identification (RFID) system. This device does not use RFID capability for location determining.

U.S. Pat. No. 7,027,039 issued to Henty discloses a computer system with a passive wireless mouse, wherein the passive mouse includes passive transponder tags configured adjacent to the perimeter of the mouse ball comprising a body portion of the mouse. Further, an oriented antenna design, inductive coupling pattern or capacitor pattern are provided in tags chosen so that the tuning and activation of one tag is provided by the vertical motion of the mouse ball whereas the other tag will be affected by the horizontal ball motion. Therefore, as the mouse ball is rotated the two tags will be tuned and detuned repeatedly with a duty cycle which corresponds to the velocity of the rotating mouse ball. This thus provides two components of the rotational motion of the mouse ball which can be used to provide the specific speed and direction of the mouse ball. This in turn can be used to accurately track mouse ball position to provide conventional mouse control functions. However this system lacks the capability to detect movement in three dimensions.

U.S. Pat. No. 7,280,097 to Chen et al. discloses a human interface input acceleration system, wherein in one implementation, the auxiliary input accelerator device may be a programmable radio frequency identification (RFID) key fob. Today, many workers gain access to their secure workplace via an RFID key fob. The circuitry in such a key fob may be housed inside an input accelerator with buttons, sensor arrays and a wireless communication protocol to be used as an auxiliary input accelerator device to the host device.

Therefore, there is a need for a pointing device that overcomes the shortcomings of the existing art. More specifically, none of the devices mentioned above uses the radio frequency (RF) signal to detect translation of the device or to acquire the device position.

SUMMARY OF THE INVENTION

Briefly, according to an embodiment of the invention a wireless input device for a computer system includes a plurality of directional antennas used for both receiving energy from an external electromagnetic field and for providing location information to the computer. The input device also includes a memory storing identification information specific to the mouse so that its user can be identified to a computer. The plurality of directional antennas can be embedded in a mouse pad and the input device acts as a computer mouse. The plurality of directional antennas may be embodied as dipole antennas, yagi antennas or other antennas suitable for short range radio frequency communication.

According to an embodiment of the present invention, the input device can be a wrist-worn device. In another embodiment of the present invention, the input device can be worn on a finger, with a size and shape similar to a ring. The input device includes at least one antenna for communicating with the plurality of directional antennas.

According to an embodiment of the present invention, an input device for use with a computer system includes: a pad and a portable unit operating as a computer mouse. The pad includes: a first antenna providing power to the portable unit, a radio frequency transmitter, a radio frequency receiver, a data link between the pad and the computer system, and an array of radio frequency antennas used for tracking a location of the portable unit. The portable unit includes at least one mouse antenna reflecting the radio frequency signals from the pad. The reflected radio frequency signals are used to estimate a location of the portable unit with respect to the array of radio frequency antennas in the pad.

BRIEF DESCRIPTION OF THE DRAWINGS

To describe the foregoing and other exemplary purposes, aspects, and advantages, we use the following detailed description of an exemplary embodiment of the invention with reference to the drawings, in which.

Figure 1A:
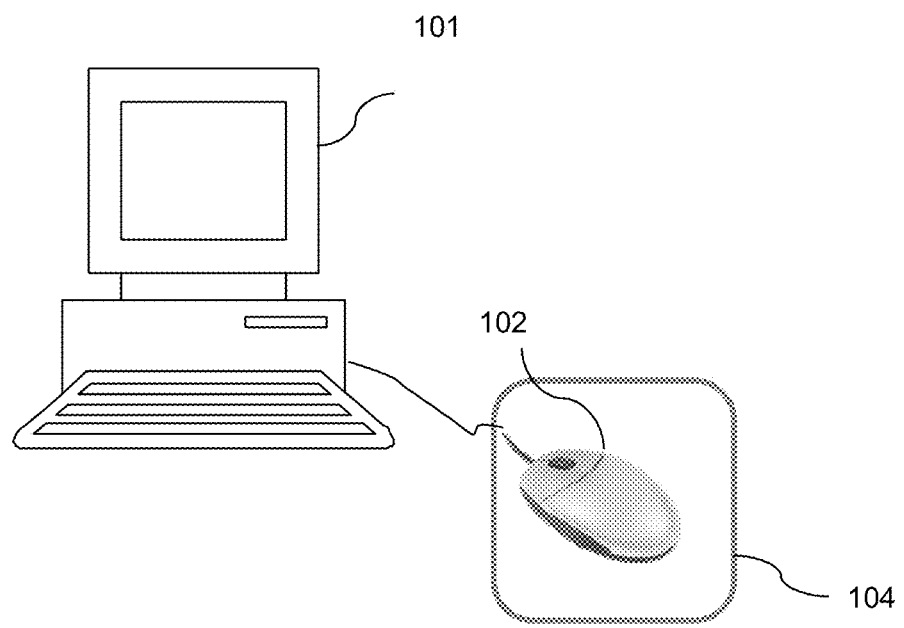
FIG. 1A is a simplified illustration of a system with a wired mouse, according to the known art.
Figure 1B:
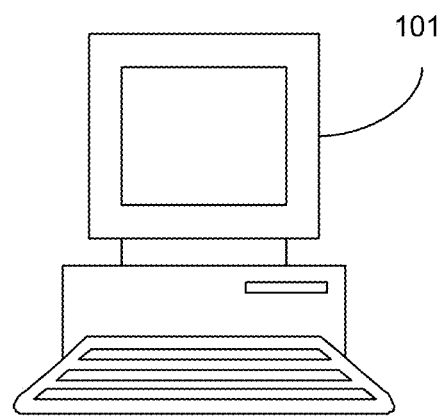
FIG. 1B is a simplified illustration of a system with another wireless mouse and pad, according to the known art.
Figure 1B:
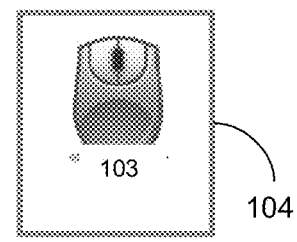

While the invention as claimed can be modified into alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the scope of the present invention.

DETAILED DESCRIPTION

Figure 2:
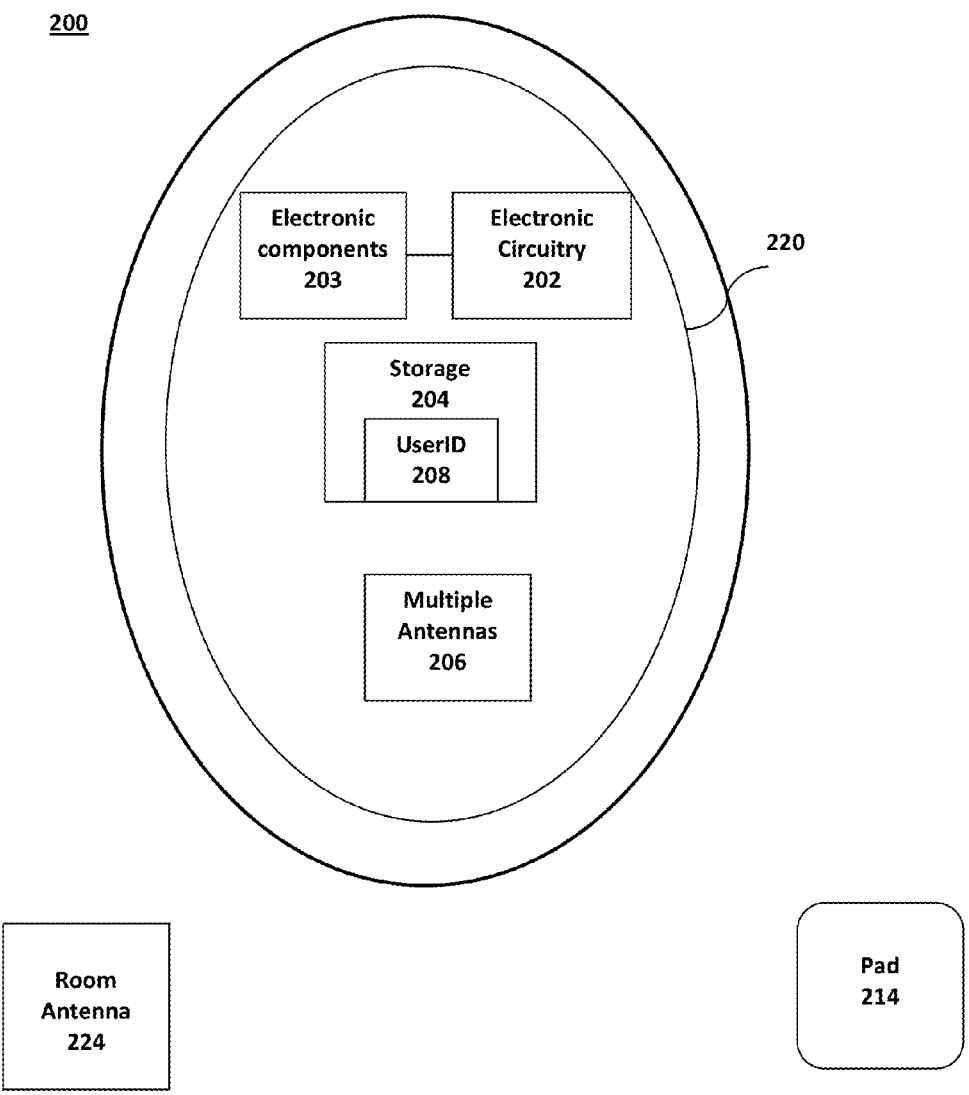
FIG. 2 is a simplified illustration of an RFID mouse, according to the known art.

According to an embodiment of the present invention, a wireless RFID mouse 200 is shown in FIG. 2. The mouse 200 includes at minimum one or more antennae 220 to power the mouse 200 so that batteries are not required. This serves to make the mouse 200 extremely light and highly portable. The antenna is connected to an electronic circuitry 202 for converting the RF (radio frequency) frequency current produced by the antenna 220 into a DC (direct current) source suitable for running electronics 203 in the mouse. Multiple isotropic or directional antennas 206 operable to transmit RFID signals, and storage (such as a non-volatile memory) 204 for storing a user identifier 208 are also included. We note that FIG. 2 should be viewed as a schematic of the various components included in mouse 200 and not as a layout map of the various components. For example, the memory 204 and most of the electronics would occupy a very small (less than 1%) of the area taken by the antennae 220. As will be explained later in more detail the mouse pad 214 incorporates an antennae array that provides RF power to the mouse and in some embodiments the array is used to determine the mouse spatial (x,y,z) coordinates. For some gaming applications additional antennas 224 used for determining the device position may be included at various locations in the room.

The multiple antennas 206 and the antenna embedded in pad 214 are used to determine the absolute location and orientation of the mouse 200. There is no need for an actual lateral movement of the mouse 200. This is different than a conventional mouse where a change in position such as a translation in X-Y movement is the output of the mouse. With an RFID mouse the absolute location (coordinates) of the mouse is the output of the device and this information is obtainable without the need to translate the mouse. For example, the directional information may relate to the x-y plane, such as in what direction the mouse 200 is pointing; or it may relate to the z-axis, such as picking up the mouse 200 from a mouse pad. This enables the addition of new functionality to the mouse 200. The mouse 200 can even be wearable (like a watch or a ring) for games and use with portable digital devices with touch-screen interfaces such as the iPad™ by Apple® (see FIGS. 5 and 6). Like the Wii™ controller (Wii is a trademark of Nintendo® of America Inc.), the RFID mouse 200 does not need a surface; but unlike the Wii™, it does not require batteries and the movement is detected via directional antennas embedded in the mouse 200.

Further, the RFID mouse provides additional security to the computer in two aspects: 1) proximity and 2) user identification (ID). The proximity feature provides security in that RFID transmission is generally limited to a range of one meter; therefore a user of the RFID mouse must be within a short range of distance from the computer in order to operate the computer. Outside of that range, the RFID mouse will not be operable with that system. However, for gaming applications the RFID transmitter/receiver embedded or attached to the gaming box can have an extended range of up to a few meters.

The RFID mouse provides storage 204 for storing a unique identifier 208 associated with a computer user. Because the mouse 200 is an input device, the "user ID" feature has the following advantages. The mouse 200 can be used as a personal identifier (like a badge). In a situation where multiple users share a computer, the computer can grant different privileges to the users based on the identification contained in the mouse 200 each of them carries. This is different than what is practiced today where a single mouse is used by all the users of a computer. The RFID mouse 200 in this embodiment becomes a personal key to multi-user computer resources. It may even replace the need for password protection. The RFID mouse 200 is very inexpensive to manufacture so it may be replaced on a regular basis in much the same way passwords are changed.

In another embodiment the mouse antenna merely reflects the RF power transmitted by the RFID transponder while isotropic or directional antennas in the tablet computer or the mouse pad 214 are performing the function of obtaining the mouse position by methods such as triangulation, or time difference of arrival.

Figure 3:
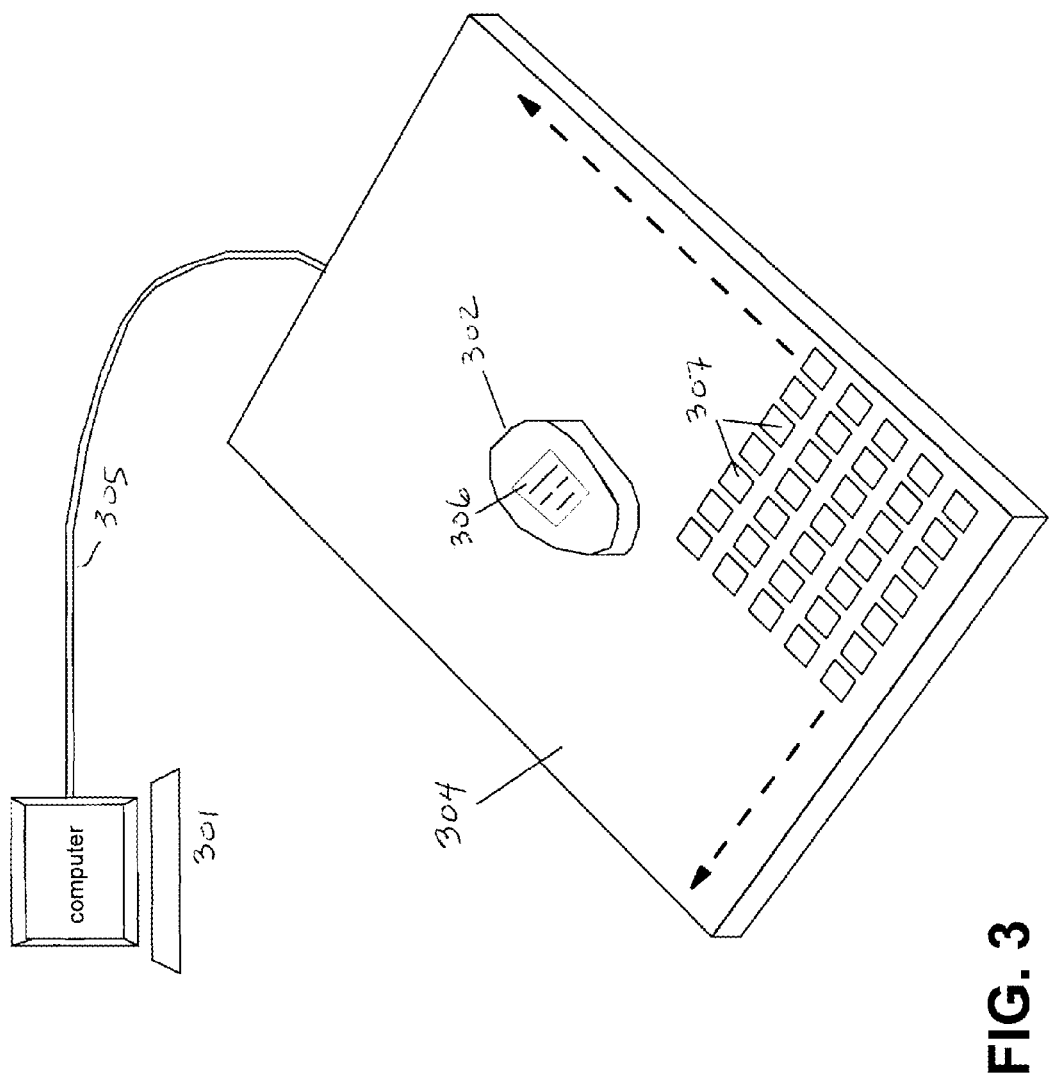
FIG. 3 is a simplified illustration of a system with an RFID mouse, according to an embodiment of the present invention.

Referring to FIG. 3, in an embodiment of the invention, an RFID-powered mouse 302 is located over a pad 304 from which it obtains its power. The RFID-powered mouse 302 transmits wireless signals to the pad 304 in a similar way as the mouse 202 that was discussed with respect to FIG. 2. These signals may be further processed in the pad and sent to the computer 301 to update the location of a cursor displayed on a screen and to change locations on the screen as the mouse 302 moves. In this embodiment, the RFID mouse 302 of FIG. 3 operates only in conjunction with the pad 304.

The pad 304 is an active device that is connected to the computer 301 via a cable (wire) 305. The cable 305 serves a dual purpose: 1) it provides power to the active components embedded in the pad 304 (radio transmitters and receiver); and 2) includes a data link for transferring data between the pad 304 and the computer 301. The data link can be any standard communication link such as a serial link or a USB link. The pad 304 includes an array of antennas 307. The antennas 307 in the pad 304 transmit RF signals to the RFID mouse 302. These RF signals are reflected from an antenna 306 embedded in the mouse 302. The reflected signals are received by the antenna array 307.

The phase and power of the received signal in each of the array elements 307 depends on its relative position from the mouse location. It is therefore possible to calculate the mouse location for example by methods such as multilateration (computing the time difference of arrival (TDOA) of a signal reflected from the mouse antenna 306 to three or more antennas 307 in the pad), trilateration or triangulation. The coordinates (x, y, z) calculation can be performed using a simple processor embedded in the pad 304 or the processing may be performed by the computer 301. The calculation of the z movement (elevation) can be performed using the TDOA method. It is further emphasized that contrary to a conventional mouse that uses a conventional optical system or a mechanical roller to detect X-Y translation of the mouse, the system described in FIG. 3 uses the RF signal to acquire the mouse position and does it in three dimensions.

Methods that rely only on time measurement (i.e. do not require the angular information as in triangulation) can use isotropic antennas. Theses antennas are isotropic in the sense that their gain has no spatial dependency. In other words the power generated in the antenna is independent of the direction from which the radio signal was received. Isotropic antennas are typically easier to fabricate and thus enable additional cost reduction.

Figure 4:
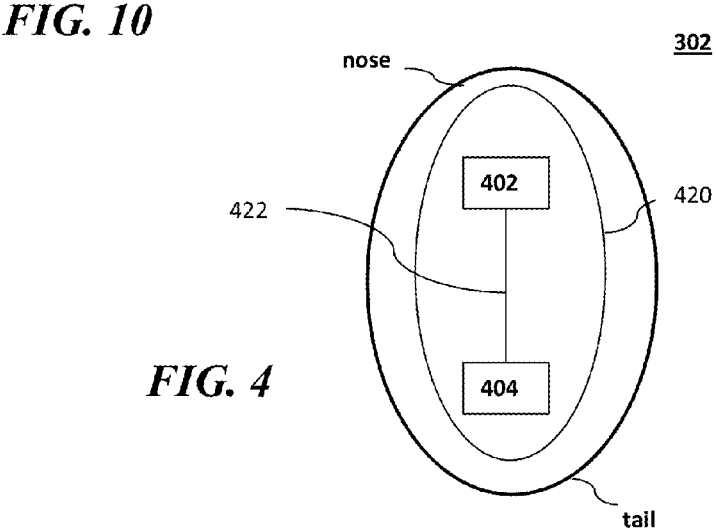
FIG. 4 shows a wireless RFID mouse with multiple antennas, according to an embodiment of the present invention.

Referring to FIG. 4, the mouse orientation (i.e., the direction at which the mouse is pointing) can be obtained by installing an antenna 402 at the "nose" of the mouse and an antenna 404 at the "tail." Interference techniques can be used by the receiving antenna 307 to measure the rotation of the mouse with respect to the normal between the antenna 307 and the line 422 connecting the nose antenna 402 and the tail antenna 404 of the mouse 302. Interferometry methods, however, can lead to ambiguity, which can be avoided by using absolute localization of the nose and the tail. When the nose antenna 402 and the tail antenna 404 uses different transmission frequencies for the reflected signals, absolute and independent localization of the nose and the tail is possible. In addition to the mouse location the mouse orientation is also obtained. FIG. 4 also shows the antennae 420 used for powering the mouse 302 from the pad 304. Because the mouse 302 receives its power source from the pad 304 it does not require a battery and is much lighter than a conventional mouse.

The RFID mouse 302 also supports additional functions such as indicating if a mouse button is pressed, and user identifications. A pressed key can be engineered to make the mouse transmitter use a different transmission frequency, or to add a trailer to the reflected signal indicating which of the mouse buttons was pressed.

Figure 10:
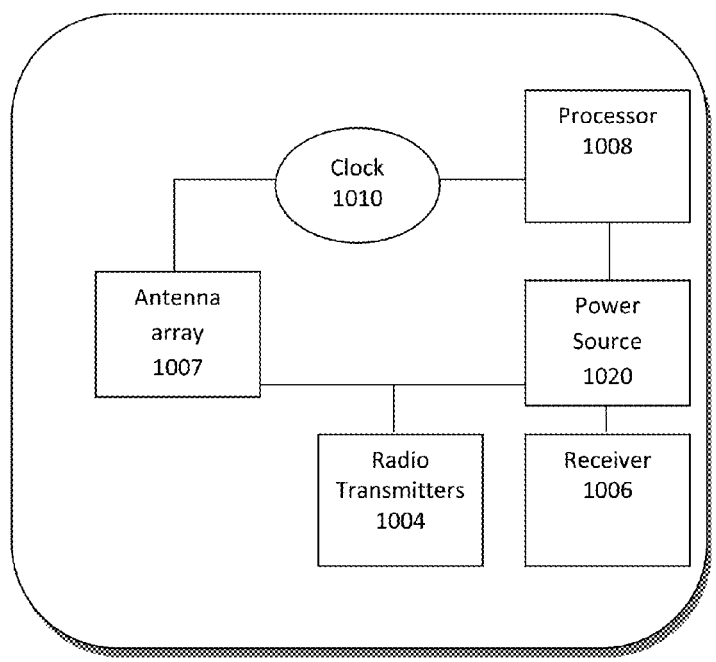
FIG. 10 is a block diagram of the mouse pad from FIG. 3, according to an embodiment of the present invention.
Figure 6:
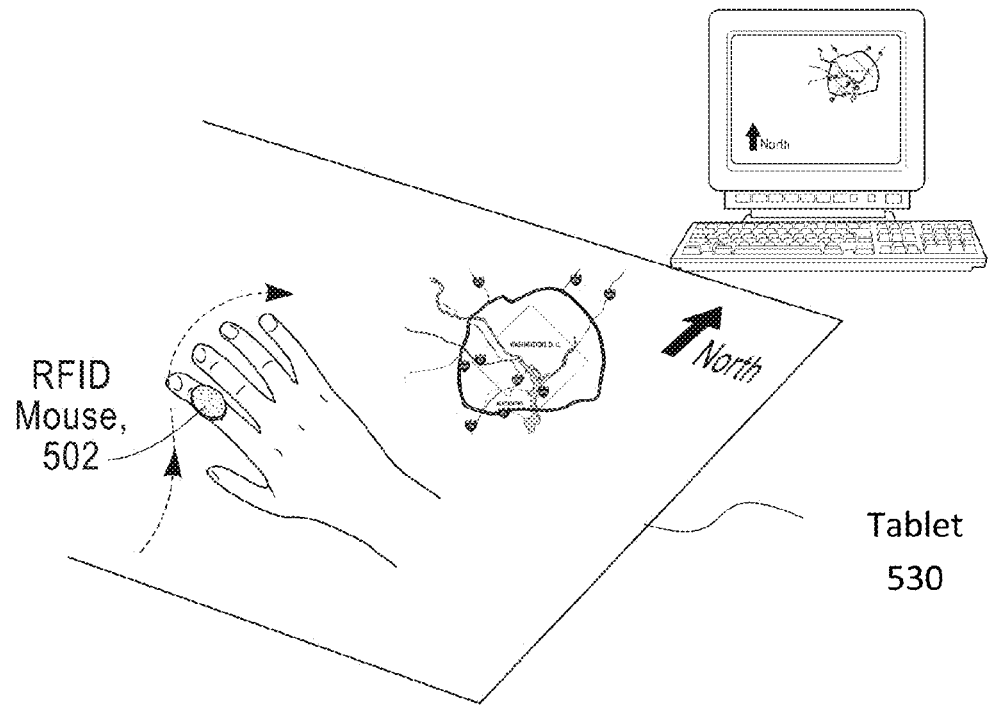
FIG. 6 is a wireless mouse wearable on a finger according to another embodiment of the invention.

Referring to FIG. 10, there is shown a simplified block diagram showing essential components of the pad 304. Radio transmitters 1004 are operatively coupled with a receiver 1006 which in turn is operatively coupled with an optional processor 1008. The processor 1008 is optional because the processing may be done entirely within the computer 301. A power induction source 1020 such as a coil serves to power the mouse. Additionally, when a tablet device is used as computer 301 an external pad 304 is no longer needed since the tablet also functions as a pad, and the pad 304 components are actually embedded in the tablet device. For ease of operation the mouse will take the form of a ring as shown in FIG. 6. Referring also to FIG. 3 in a typical mode of operation all of the antennas in the antenna array 1007 share the same clock 1010. The clock 1010 is distributed from a single source and each antenna in the antenna array 1007 has a delay element to correct for the time it takes the clock signal to reach the antenna from the single source.

At every period T the antennas 307 transmit a signal. The signal travels to the mouse 302 and gets reflected. Each antenna k in the array 307 receives the signal with a delay $\tau_k$ that is proportional to the distance $R_k$ of the antenna k from the mouse. An autocorrelation of the transmitted signal and the reflected signal will give the delay $\tau_k$. Using TDOA it is possible to compute the spatial coordinates of the mouse as the intersection point of all the spheres constructed with a radius $R_k$ and the origin being the coordinates of antenna k.

One drawback of the TDOA method described above is its sensitivity to multiple reflections. In addition to the reflected signal from the mouse antenna 306 the transmitted signal may also be reflected from other objects. These reflections may lead to false detection of the actual mouse location. To avoid the issue of multiple reflections it is preferable that the mouse 302 will transmit the reflected signal in a different frequency than the transmitted signal. The receiver at each antenna 307 is tuned to the frequency of the reflected signal from the mouse and therefore does not recognize reflected signals that are transmitted at a different frequency.

Triangulation can also be used to calculate the mouse coordinates. In the case that triangulation is used the antenna array 307 includes directional antennas. Each antenna unit 307 includes two directional antennas having a maximum gain shifted by 90 degrees with respect to each other. For example, if one element has a maximum gain along the north-south direction the other element in the unit 307 will have its maximum gain along the east-west direction. The reflected signal power is received and measured independently in each of the elements of antenna unit 307. The ratio of the power measured in the north-south directional element over the power measured in the east-west directional element yields the direction (angle) of the unit antenna 307 with respect to the mouse. Each unit antenna k yields one such direction, which is a line that passes through the mouse coordinates and the antenna k coordinates. The intersection point of all lines provides the coordinates of the mouse.

The mouse pad 304 may include two types of antennas. The first type may be used just to provide energy to the mouse, while the second type is used for tracking the mouse location. This enables the use of optimized antennas for energy transfer and specialized antennas for position tracking For example the use of high frequency antennas is preferable to increase the accuracy of a technique such as triangulation. However, for energy transfer to the mouse a low frequency antenna may be more robust in avoiding "dead spots" due attenuation by various objects including the user's arm.

The preferred embodiment is that of a mouse that is powered by RF energy and the RF signal is also used to acquire the mouse location. FIG. 3 shows the preferred embodiment. There are various variations to this embodiment. For example, the use of two RF frequencies. One for powering the mouse and one for acquiring the mouse position. Another variation is the use of TDOA vs. triangulations. The difference is mostly in the type of embedded antenna one chooses to use.

Figure 7:
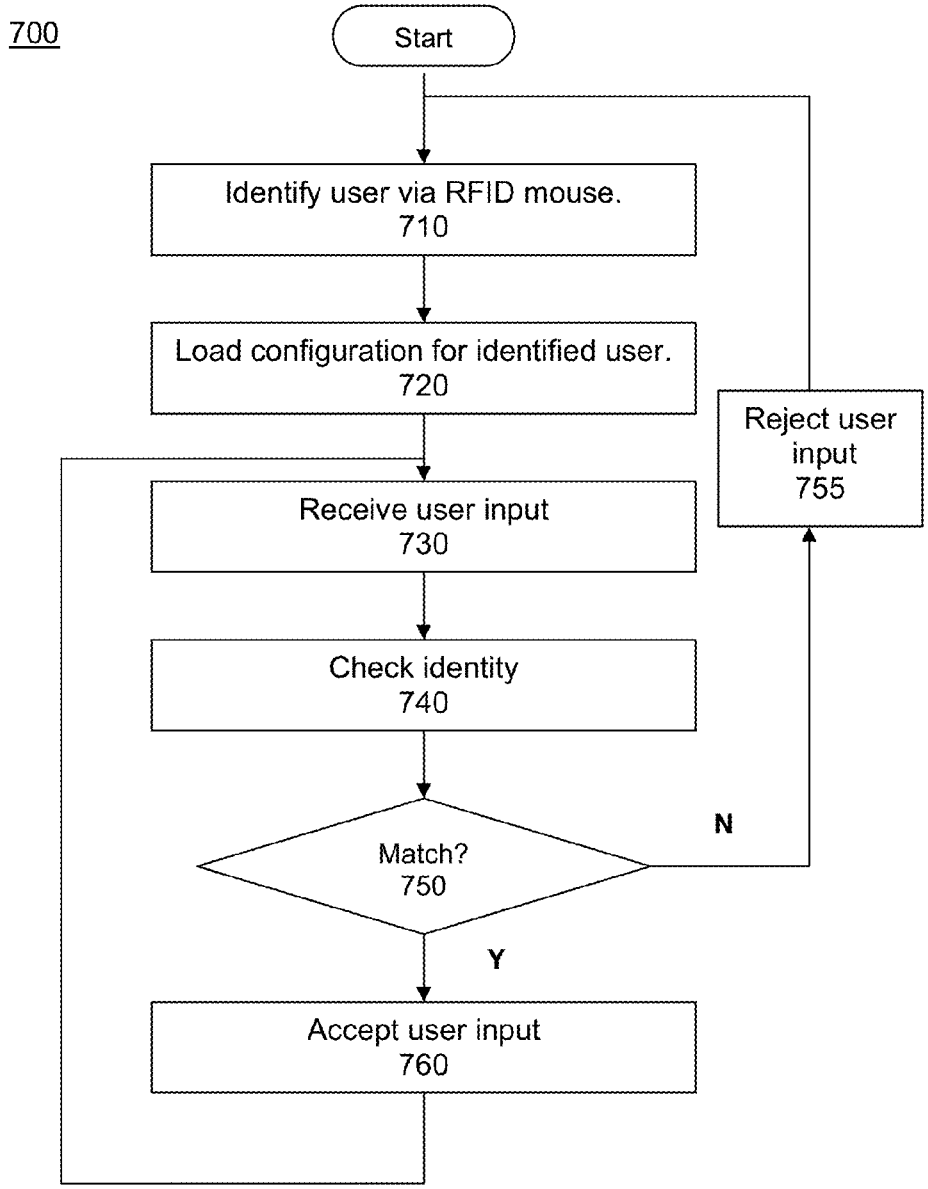
FIG. 7 is a flow chart of a process for using a wireless mouse with multiple users according to another embodiment of the invention.

Referring to FIG. 7, there is shown a flow chart 700 illustrating operation of an algorithm for a multi-user computer, according to one embodiment of the present invention. In step 710 the computer 301 of FIG. 3 identifies a user via the RFID in the mouse 302. In step 720, according to the UserID read from the mouse 302, the computer 301 loads the configuration for the identified user. This includes setting the appropriate read/write privileges for that user. Additionally, loading the configuration may include restoring a previous session for that user.

Next, in step 730 the computer 301 receives user input. The input must be verified, so in step 740 the computer 301 again checks the identity of the mouse 302. The reason for this additional check is to eliminate those situations where for example, one user passes the first ID check and then for some reason steps away from the computer 301. At this point, another user can use the previous user's configuration (including privileges) to read and input data. While steps 730 and 740 are shown as sequential steps, in practice these steps are occurring simultaneously. When the mouse sends the user input (e.g. a translation, or a button being pressed) it also send the user identification code in the same transmission.

If in step 750 it is determined that the UserID is a match for the configuration, then in step 760 the computer 301 accepts the user input. Any further input will be subjected to the same check as in step 740. If it is determined that the UserID is not a match for the configuration, then in step 755 the computer 301 does not accept the user input and may issue an error message. At this point the computer 301 will loop through the verification process again to identify this new user via the RFID mouse 302.

For purposes of this invention, computer system 301 may represent any type of computer, information processing system or other programmable electronic device, including a client computer, a server computer, a portable computer, an embedded controller, a personal digital assistant, and so on. The computer system 301 may be a stand-alone device or networked into a larger system.

Figure 5:
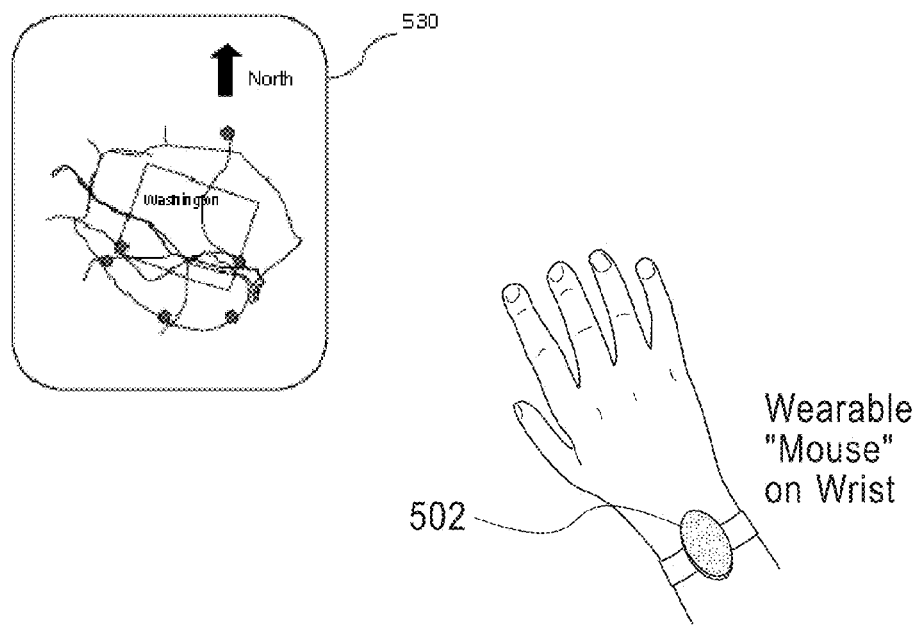
FIG. 5 is a wireless mouse wearable on a wrist according to another embodiment of the invention.

FIGS. 5 through 6 show additional applications for the mouse 302. FIG. 5 shows the mouse 502 as a wearable device. The mouse 502 of FIG. 5 is shown worn on a user's wrist similar to a wristwatch and interacting with a touchscreen interface of a portable digital device 530 such as the iPad™ tablet computer. Note that device 502 can also be worn on the same side as the palm of the hand to reduce absorption of the RF signal by the arm.

Referring to FIG. 6 there is shown a wireless mouse 502 wearable on a finger and interacting with the tablet computer 530 of FIG. 5, according to another embodiment of the present invention. In this embodiment, the tablet computer 530 may contain embedded antennas such as the antenna array 307 of FIG. 3. This embodiment is also suitable for games and other uses where fine motor movement is used to control graphics on a computer display. Both embodiments shown in FIGS. 5 and 6 display highly transportable form factors and further emphasize the mouse 502 as personally associated with a user and thus being suitable for user identification (similar to a badge).

Figure 8A:
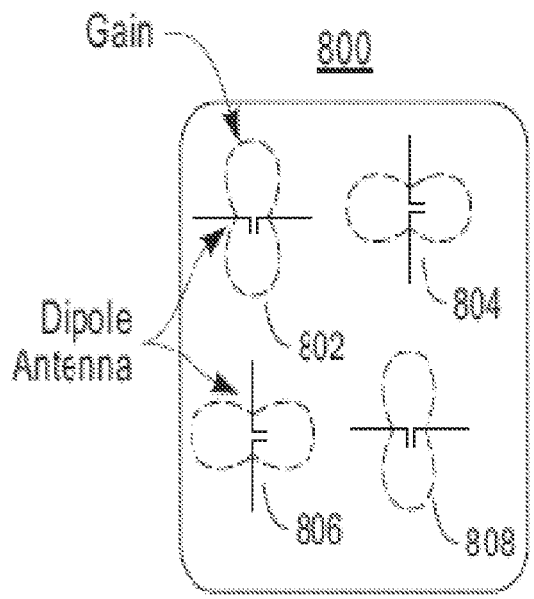
FIG. 8A schematically illustrates four dipole antennae on the mouse pad, according to another embodiment of the invention.
Figure 8B:
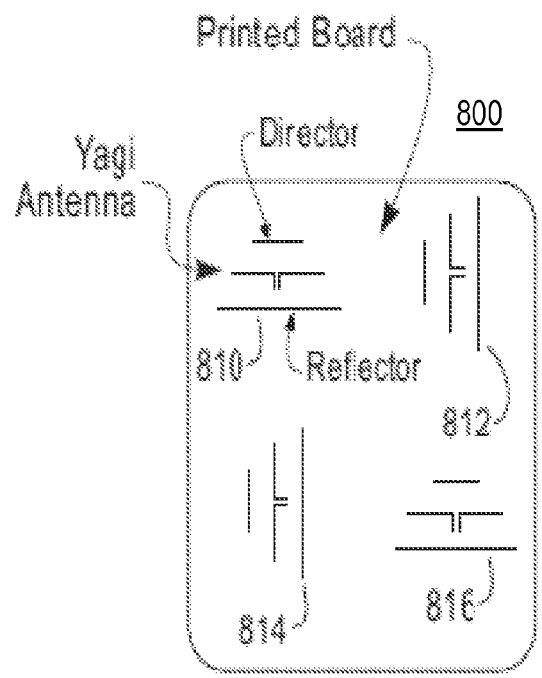
FIG. 8B schematically illustrates four Yagi antennas on the mouse pad, according to another embodiment of the invention.
Figure 9:
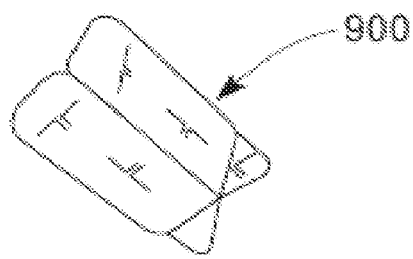
FIG. 9 schematically illustrates a three dimensional array of antennae according to another embodiment of the invention.

Referring to FIG. 8A, there is shown a mouse pad 800 with a schematic illustration of four dipole antennas 802 804 806 and 808. The dipole antennas 802 804 806 and 808 provide more directional signals that can be used by the computer to better determine the location and movement of the mouse. FIG. 8B shows a mouse pad 800 with a schematic illustration of four Yagi antennas 810 812 814 and 816. The Yagi antennas also provide more directional signals that can be used by the computer to better determine the location and movement of the mouse. Also, as is well-known, a Yagi antenna includes an active element that is fed the signal to be transmitted or receives a signal. The Yagi antenna also includes a slightly longer element that reflects the signal and one or more director elements that help provide a more directional signal. FIG. 9 shows a three-dimensional array antenna 900 according to another embodiment of the invention. As discussed above, different antennae having different locations and orientations produce different signals at the computer. In this case a three-dimensional physical structure provides a plurality of positions for the mouse antennae.

Therefore, while there has been described what is presently considered to be the preferred embodiment, it will understood by those skilled in the art that other modifications can be made within the spirit of the invention. The above descriptions of embodiments are not intended to be exhaustive or limiting in scope. The embodiments, as described, were chosen in order to explain the principles of the invention, show its practical application, and enable those with ordinary skill in the art to understand how to make and use the invention. It should be understood that the invention is not limited to the embodiments described above, but rather should be interpreted within the full meaning and scope of the appended claims.

The invention claimed is:

1. An input device for use with a computer system, the input device comprising:
 a pad comprising:
  a first antenna providing power to a portable unit operating as a computer mouse;
  a radio frequency transmitter;
  a radio frequency receiver;

a data link transferring data between the pad and the computer system; and an array of radio frequency antennas transmitting a radio frequency signal and receiving a corresponding radio frequency signal reflected by an at least one mouse antenna used for tracking a location of the portable unit; and the portable unit comprising the at least one mouse antenna reflecting the radio frequency signals; and wherein the reflected radio frequency signals are used to estimate a location of the portable unit with respect to the array of radio frequency antennas in the pad.

2. The input device of claim 1 further comprising a processor device calculating a location of the portable unit in three-dimensional space relative to the pad.

3. The input device of claim 2 wherein the processor device calculates the location of the portable unit by interpreting the radio frequency signals transmitted from the portable unit to the antenna array as coordinates in three-dimensional space.

4. The input device of claim 3 wherein the processor device uses the coordinates to update a corresponding position and movement of a cursor displayed on a screen of the computer system.

5. The input device of claim 1 wherein a phase and power of signals reflected from the portable unit to the antenna array depends on said signal's relative position from the portable unit.

6. The input device of claim 1 wherein the portable unit operates within radio frequency range of the array of radio frequency antennas and comprises:
memory storing an identifier;
a second antenna reflecting radio frequency signals to the array of radio frequency antennas in the pad; and
electronic circuitry coupled with the second antenna.

7. The input device of claim 1 wherein the at least one mouse antenna comprises a first antenna located at a nose of the portable unit and a second antenna located at a tail of the portable unit.

8. The input device of claim 1 wherein estimating the location comprises using at least one of the following methods: time difference of arrival, trilateration, and triangulation.

9. The input device of claim 1 wherein the radio frequency antennas are directional.

10. The input device of claim 1 wherein the reflected radio frequency signals from the at least one mouse antenna are transmitted at a frequency different than that of the transmitted radio frequency signals from the pad.

11. The input device of claim 1 wherein the array of radio frequency antennas comprise at least a first type of low frequency antennas and a second type of high frequency antennas.

12. The input device of claim 11 wherein the array of radio frequency antennas transmit in both a low frequency and in a high frequency, and wherein transmitting at the low frequency is used to power the portable unit, and wherein transmitting at the high frequency is used for acquiring a location of the portable unit.

13. The input device of claim 11 wherein the first type of low frequency antennas and the second type of high frequency antennas are of different frequencies, a first frequency for powering the portable unit, and a second frequency for acquiring a position of said portable unit.

14. The input device of claim 11 wherein the portable unit transmits the reflected radio frequency signal in a different frequency than a signal transmitted from the pad.

15. The input device of claim 1 wherein the pad further comprises a global clock connected to each radio frequency antenna in the array of radio frequency antennas.

16. The input device of claim 1 wherein the portable unit further comprises storage for storing a user identifier.

17. The input device of claim 1, wherein the portable unit is wrist-worn.

18. The input device of claim 1, wherein the array of radio frequency antennas is embedded in a tablet device and wherein the portable unit is operated as a wearable ring over the tablet device.

* * * * *